United States Patent [19]
Henninger et al.

[11] Patent Number: 5,900,704
[45] Date of Patent: May 4, 1999

[54] PROCESS AND SYSTEM FOR CONTROLLING AN ELECTROHYDRAULIC PRESSURE SUPPLY FOR AN AUXILIARY POWER DEVICE FOR AN AUTOMOTIVE VEHICLE

[75] Inventors: Michael Henninger, Kelkheim; Reinhold Berberich, Frankfurt, both of Germany

[73] Assignee: VDO Adolf Schindling AG, Frankfurt, Germany

[21] Appl. No.: 08/755,061

[22] Filed: Nov. 22, 1996

Related U.S. Application Data

[63] Continuation-in-part of application No. 08/394,376, Feb. 24, 1995, abandoned.

[30] Foreign Application Priority Data

Jun. 10, 1994 [DE] Germany .............................. 44 20 309
Dec. 6, 1995 [DE] Germany ........................... 195 45 385
Jan. 26, 1996 [DE] Germany ........................... 196 02 729

[51] Int. Cl.$^6$ .................................................. H02P 1/00
[52] U.S. Cl. ........................... 318/268; 318/590; 388/809
[58] Field of Search .................................. 318/268, 271, 318/798–811, 566, 590, 596, 432–434; 60/445–449, 451; 388/809–815

[56] References Cited

U.S. PATENT DOCUMENTS

| | | | |
|---|---|---|---|
| 3,968,814 | 7/1976 | Swanson et al. | 137/505.18 |
| 4,474,104 | 10/1984 | Creffield | 91/497 |
| 4,573,319 | 3/1986 | Chichester | 60/422 |
| 4,940,103 | 7/1990 | Momiyama | 180/422 |
| 5,001,407 | 3/1991 | Suzuki et al. | 318/268 |
| 5,518,390 | 5/1996 | Nakamura et al. | 425/145 |
| 5,553,683 | 9/1996 | Wenzel et al. | 180/417 |
| 5,641,033 | 6/1997 | Langkamp | 180/422 |
| 5,668,457 | 9/1997 | Motamed | 318/606 |

*Primary Examiner*—Brian Sircus
*Attorney, Agent, or Firm*—Martin A. Farber

[57] ABSTRACT

A process and a system for controlling an electrohydraulic pressure supply for an auxiliary power device of an automotive vehicle in which a hydraulic pump system is operated by means of an electric motor the speed of rotation of which is controlled by operating parameters. In order to operate the auxiliary power system with the least possible energy, the changes in speed of rotation which differ from a predetermined desired speed of rotation of the electric motor are recognized and levelled out. In order to operate the power-assisted system with the least possible energy, the switching of the electric motor (2) from stand-by operation to full-load operation, or vice versa, takes place as a function of the speed of rotation (n) of the electric motor (2).

22 Claims, 3 Drawing Sheets

5,900,704

PROCESS AND SYSTEM FOR CONTROLLING AN ELECTROHYDRAULIC PRESSURE SUPPLY FOR AN AUXILIARY POWER DEVICE FOR AN AUTOMOTIVE VEHICLE

RELATED APPLICATION

This application is a continuation-in-part of our application Ser. No. 08/394,376 filed Feb. 24, 1995, abandoned.

FIELD AND BACKGROUND OF THE INVENTION

The invention relates to a process and a system for controlling an electrohydraulic pressure supply for an auxiliary power device of an automotive vehicle for operating a hydraulic pump system by means of an electric motor, and wherein the electric motor is switched from stand-by operation to full-load operation only in case of need.

It is well known in automobile engineering to develop auxiliary power systems by means of external hydraulic energy. In such a case, a pump system is drive by means of an electric motor. The electric motor is connected directly to the battery voltage of the vehicle.

A change in load causes an increase in output, particularly an increase in current, of the electric motor. Power-assisted steering systems are known, for instance, which, proceeding from a stand-by operation, operate the electric motor with full power only in case of need. In his case, there is a difficulty of recognizing the case of need. Furthermore, full energy is fed to the system also upon operation under partial load. In addition, due to the finite rate of acceleration of the electric motor, there is a time delay in the response of the system which is disturbing to the driver.

SUMMARY OF THE INVENTION

It is an object of the invention to provide a process and an arrangement for the electrohydraulic supplying of pressure for a power-assisted device which, in the specific case of need, permits a supporting by the auxiliary force with the slightest possible expenditure of energy and at the same time is easy to develop.

In accordance with the invention, this object is achieved in the manner that the switching of the electric motor (2) from stand-by operation to full-load operation or vice versa takes place as a function of the speed of rotation (n) of the electric motor (2).

According to the invention, the changes in speed of rotation of the electric motor caused by changes in the operating parameters as compared with a predetermined desired speed of rotation are recognized and levelled out. The different load requirements can be reliably detected by means of the speed of rotation.

The switching of the electric motor (2) from stand-by operation to full-load operation advantageously takes place when the difference in the speed of rotation ($\Delta n$) of the motor speed (n) over a given first period of time ($\Delta t_1$) is greater than a first threshold value (x).

The switching of the electric motor (2) from full-load operation to stand-by operation is effected when the speed of rotation (n) of the motor during a second period of time $\Delta t_2$ is greater than a speed threshold value ($n_s$). In this connection, it is assumed that the second period of time ($\Delta t_2$) exceeds a minimum period of time (t).

The consideration of the speed parameters selected over given periods of time permits a dependable recognition as to whether a case of full load is present or not. Brief fluctuations do not lead to a change in the condition of operation of the electric motor. The leveling out in stand-by operation takes place so slowly that the faster changes in speed can be recognized and lead to switching to load operation.

In one embodiment, during the stand-by operation of the electric motor (2) the deviations in speed of rotation of the electric motor (2) from a predetermined desired speed of rotation ($n_{SB}$) are recognized and leveled out.

In this connection the desired speed of rotation is so selected that it leads, under all operating conditions, to a sufficient power-assisted support in case of need.

In this connection, the desired speed of rotation of the electric motor is so selected that, under all limit conditions, there is sufficient support by auxiliary force in case of need.

The advantage of the invention is that, for the support by the auxiliary force, only as much energy is removed from the car electrical system as is absolutely necessary for the support by the auxiliary force. Furthermore, upon the levelling out, or smoothing, of the speed of rotation of the electric motor, there is no occurrence of the high amplitude currents present during acceleration of the motor.

In addition, the levelling out permits rapid reaction of the motor to changes in the operating parameters such as load, temperature, and supply voltage, since the kinetic energy present in the motor is utilized. As a result of the avoidance of sudden changes in the speed of rotation of the motor, in stand-by operation the life of the electric motor is increased, since high current intensities result in a high consumption of the carbon commutator brushes of the electric motor.

The method of the invention operates independently of variations in the supply voltage and the temperature.

Since a uniform acoustic frequency spectrum is produced by the maintaining of a constant speed of rotation, noises occurring in the vehicle can be attenuated in targeted fashion.

The speed of rotation is determined by a suitable method for detecting the speed of rotation, and the electric motor is advantageously controlled via a pulse-width-modulated voltage signal. In this connection, the switching from standby operation to full load operation takes place when the pulse-pause ratio of the control signal is greater than a threshold value (y).

To provide a steering assistance which is independent of the speed of the vehicle, a desired value of the speed of rotation of the electric motor is to be adapted to the speed of the vehicle at the time.

One arrangement for the carrying out of the process has a control electronic system which is connected to the electric motor and also to a speed-of-rotation detection device. The speed-of-rotation detection device detects the rotational speed of the electric motor.

Accordingly, the invention provides a process for controlling an electrohydraulic pressure supply for an auxiliary-force device of an automotive vehicle in which a hydraulic pump system is operated by means of an electric motor. The speed of rotation of the electric motor is controlled by operating parameters, and deviations in speed of rotation from a predetermined desired speed of rotation of the electric motor are recognized and levelled out.

Further according to a feature of the invention, the deviations in speed of rotation caused by a change in load are levelled out.

Still further, the deviations in speed of rotation caused by a change in the steering torque are balanced out.

Yet further, the desired speed of rotation is varied in accordance with the speed of the vehicle. This may be accomplished, for example, by storing desired motor speed, via a read only memory (ROM), as a function of vehicular speed.

According to another feature of the invention, deviations in speed of rotation caused by a change in the supply voltage are levelled out.

Moreover, the deviations in speed of rotation caused by temperature influences are levelled out.

Also, the electric motor is cyclically controlled for the levelling out of deviations in the speed of rotation.

Furthermore, the cyclic control of the electric motor is effected via a variation of the pulse width of the control signal.

Yet still with a feature of the invention, the electric motor is operated continuously.

The invention also includes a system for carrying out the process, wherein the electric motor (2) is energized by a control electronics system (3) responsive to a speed-of-rotation detection device (4) which detects a rotational speed of the electric motor (2).

The invention may be produced with numerous embodiments.

BRIEF DESCRIPTION OF THE DRAWINGS

One embodiment of the invention is explained in further detail below, with reference to the figures shown in the drawings; wherein.

DETAILED DESCRIPTION OF THE PREFERRED EMBODIMENT

Figure 1:
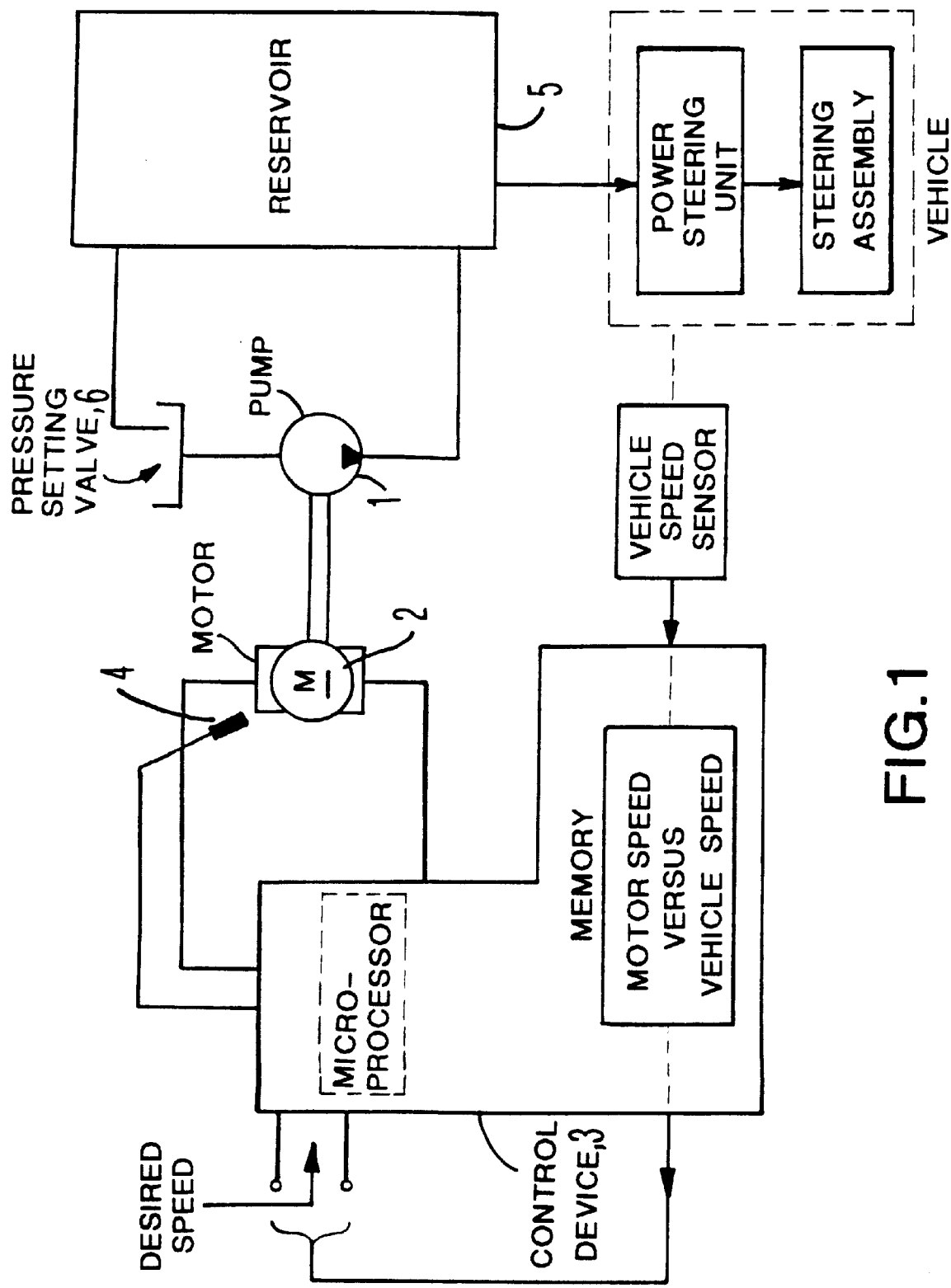
FIG. 1 is an arrangement for controlling an electrohydraulic pressure supply.

FIG. 1 shows an electrohydraulic pump supply in which steering assistance is obtained via the oil pressure in a circulation system reservoir 5. For controlling the oil pressure, a pump 1 is operated by an electric motor 2 to drive oil via a pressure setting valve 6 to the reservoir 5. A speed-of-rotation detection device 4 detects the speed of rotation n of the electric motor 2 and outputs a speed signal to a control device 3.

The control device 3 is, in this connection, preferably a microprocessor which examines the signals supplied by the speed-of-rotation detection device 4 as to variations in speed of rotation. The control device 3 controls the motor in timed manner as a function of these variations, and levels them out. The control device outputs a pulse-width modulated electric signal for driving the motor 2, wherein motor speed is adjusted by the pulse-width (or pulse-pause) ratio of the motor control.

Figure 2:
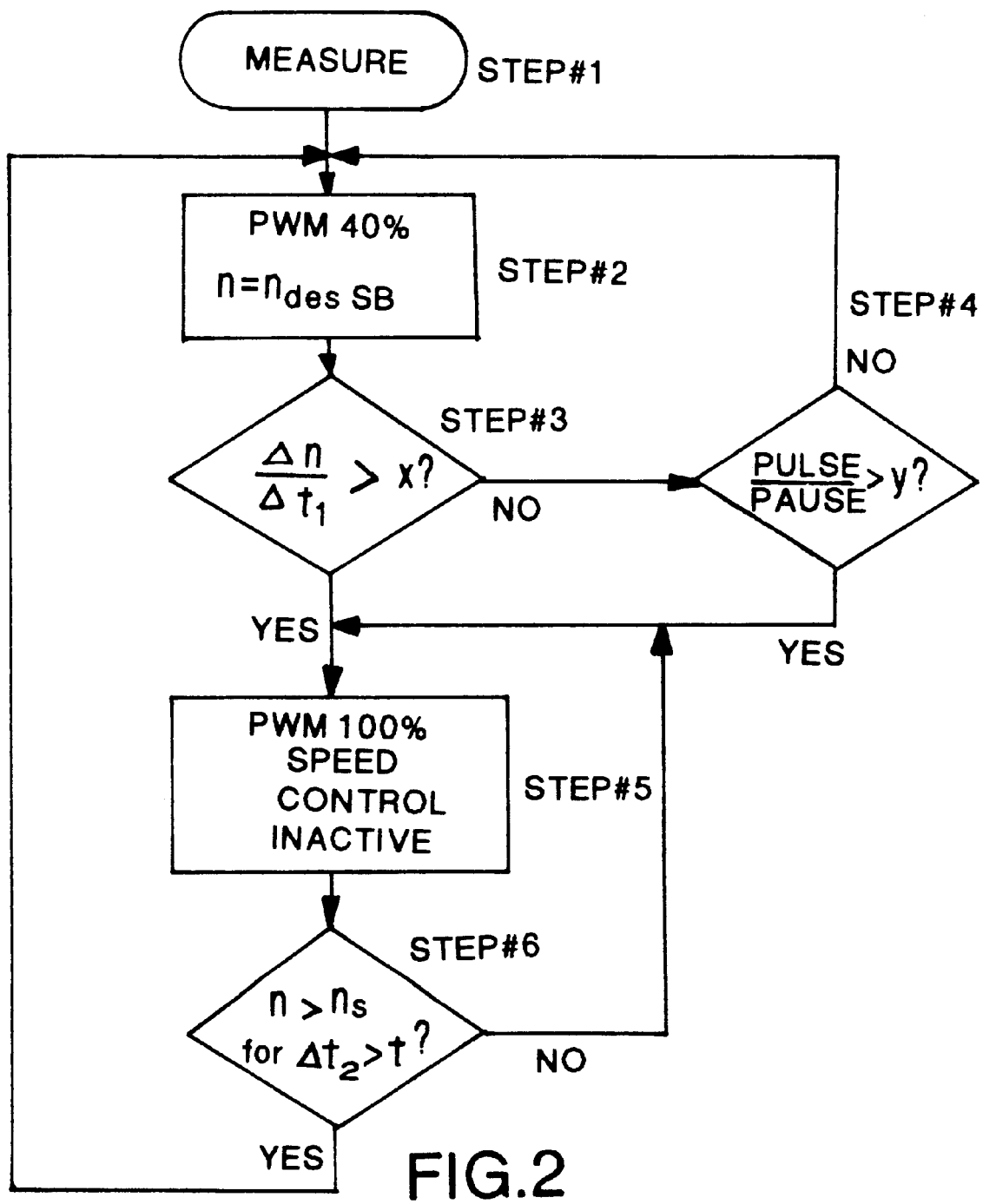
FIG. 2 is a flow chart of a program intended for the microcomputer in the arrangement shown in FIG. 1.

The method for switching the electric motor between stand-by and full-load operation will be explained further with reference to FIG. 2.

After connection of the power-assisted system, a PWM signal of 40% is given off by the microcomputer of the control device 3 to the electric motor 2. The motor 2 is in stand-by operation. During this stand-by operation, a speed control is active which levels out the instantaneous speed of rotation (n) to a stand-by desired speed of rotation ($n_{desSB}$) which is effected by tracking of the pulse-pause ratio of the motor control signal.

The fluctuations in speed of rotation $\Delta n$ occurring during this time are evaluated in step 3 as to whether the amount of the fluctuations $\Delta n$ over a period of time $\Delta t_1$ is greater than a first threshold value x.

If the threshold value x is exceeded, it is concluded that there is a sudden change in the speed of rotation n. If this is the case, then the speed control is deactivated at step 5 and a PWM signal of 100% given off. The motor operates in full load operation.

If it is noted at step 3 that the amount $\Delta n/\Delta t$ is less than the first threshold value x, then inquiry is made at step 4 as to whether the pulse-pause ratio of the PWM signal is greater than a predetermined threshold value y. If so, the electric motor 2 is also switched into full load operation (step 5). If not, then the motor remains at step 2 in stand-by operation.

If the electric motor 2 is operating in full load operation, the microprocessor checks whether the instantaneous speed of rotation n during a fixed period of time $\Delta t_2$ is greater than a speed threshold value $n_s$ (step 6). In this connection it is assumed that the fixed period of time $\Delta t_2$ exceeds a minimum period of time t.

If this case has occurred, it is concluded that the load requirements have decreased. In step 2, the electric motor 2 is switched back into the stand-by condition described above.

Figure 3:
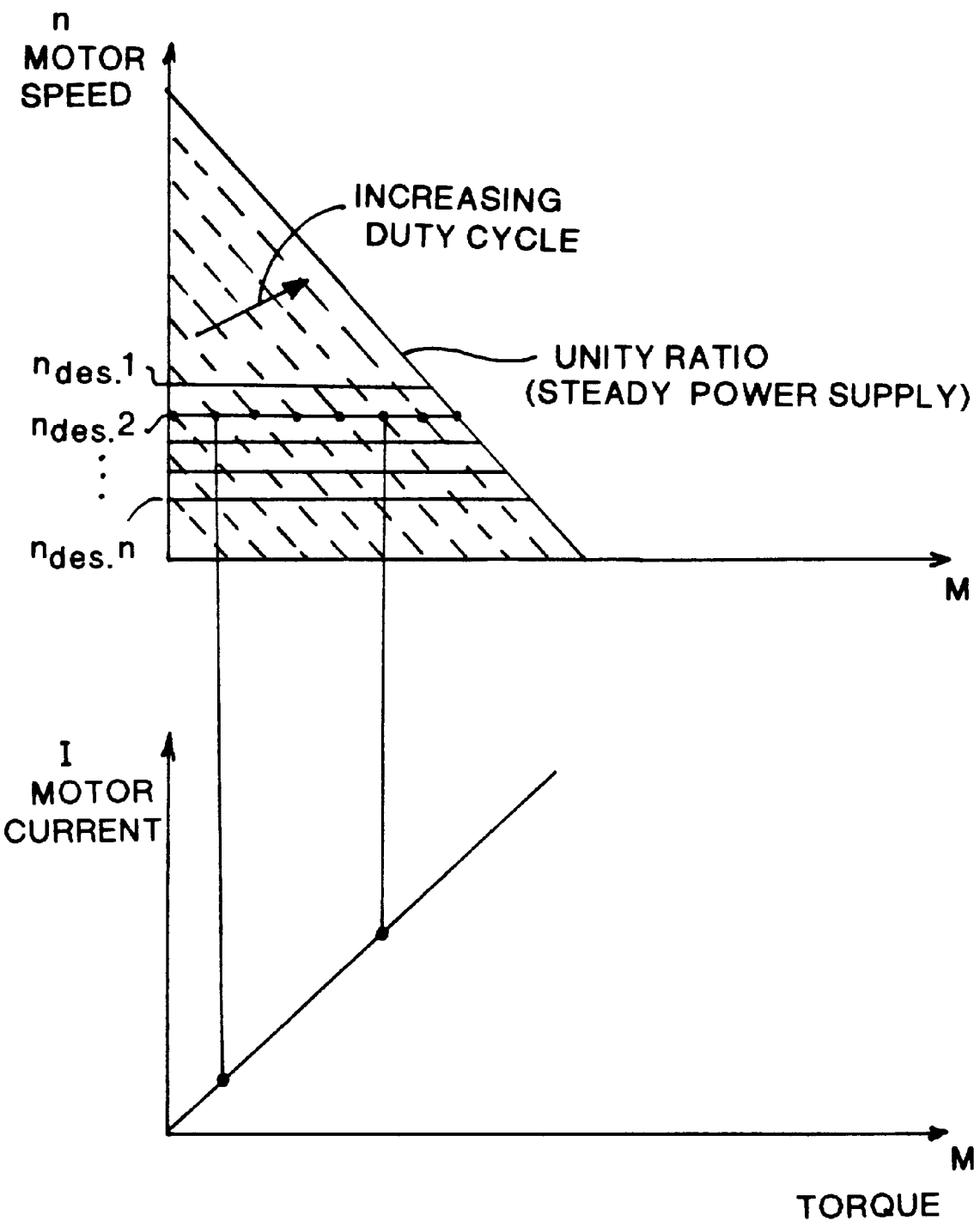
FIG. 3 is a speed of rotation regulation, in stand-by operation, in accordance with the process of the invention.

The control circuit will now be explained with reference to FIG. 3 for stand-by operation.

It is known that, with an increase in the torque M, the speed of rotation n of the electric motor 2 decreases.

The control device 3 controls the electric motor 2 in such a manner that, upon any change in the torque M, the desired speed of rotation $n_{des}$ is obtained.

The control device 3 controls the electric motor 2 via a pulse-width-modulated voltage signal which, regardless of the load torque of the motor, makes available the pulse-pause ratio (duty cycle) necessary in order to maintain the speed of rotation $n_{des}$.

Changes in the car electric voltage and temperature influences on the system are in this connection also levelled out.

In order to obtain speed-dependent steering assistance, the control device 3, in addition, evaluates the speed of travel v of the motor vehicle. Upon an increase in the speed of travel, the desired speed of rotation $n_{des}$ is adapted accordingly.

We claim:

1. A process for controlling an electrohydraulic pressure supply for an auxiliary-force device of an automotive vehicle in which a hydraulic pump system is operated by means of an electric motor, comprising steps of:

selecting a desired speed of rotation of the electric motor in accordance with operating parameters of the pressure supply;

employing a speed control mode of operation to apply a relatively small amount of current to the motor for operating the motor at the desired speed of rotation, the speed-control mode of operation smoothing deviations in speed of rotation of the electric motor from the desired speed of rotation of the electric motor;

establishing a threshold value of motor which is less than the desired speed; and upon a drop in motor speed from the desired speed below the threshold value, terminating the speed control mode and initiating a full-load mode of operation wherein there is applied to the motor a constant value of a relatively large amount of current.

2. A process according to claim 1, wherein said smoothing step counteracts deviations in the speed of rotation caused by a change in load upon the electric motor.

3. A process according to claim 2, wherein said smoothing step counteracts deviations in the speed of rotation caused by a change in the steering torque.

4. A process according to claim 3, further comprising a step of varying a desired speed of rotation of the electric motor in accordance with a speed of the vehicle.

5. A process according to claim 1, wherein said smoothing step counteracts deviations in the speed of rotation caused by a change in supply voltage.

6. A process according to claim 1, wherein said smoothing step counteracts deviations in the speed or rotation caused by temperature influences.

7. A process according to claim 1, wherein said smoothing step includes a cyclical controlling of the motor for smoothing deviations in the speed of rotation.

8. A process according to claim 7, wherein the step of cyclical controlling is effected by varying the pulse width of a control signal applied to the motor.

9. A process according to claim 1, wherein said smoothing step includes a step of operating the electric motor continuously.

10. A system for controlling an electrohydraulic pressure supply for an auxiliary-force device of an automotive vehicle in which a hydraulic pump system is operated by means of an electric motor, the system comprising:

an electric motor, a control device, and a detector of speed of the motor; and wherein the control device is responsive to a speed signal of the detector for operation in either of two modes, the first mode being for activating the motor via a speed control for continuous rotation while smoothing any deviations of motor speed from a desired speed, and the second mode provides for deactivating the speed control and placing the motor in full-load operation.

11. a process for controlling an electrohydraulic pressure supply for an auxiliary-force device of an automotive vehicle in which a hydraulic pump system is operated by means of an electric motor, comprising steps of:

employing the pump for pumping hydraulic fluid into a reservoir of the pressure supply via a pressure setting valve;

connecting an outpost of the reservoir to the auxiliary-force device;

driving the pump by the electric motor;

sensing speed of the vehicle;

selecting a desired speed of rotation of the electric motor in accordance with operating parameters of the pressure supply, said selecting step including a basing of the desired motor speed of the electric motor on the vehicle speed;

employing a speed control mode of operation to apply a relatively small amount of current to the motor for operating the motor at the desired speed of rotation, the speed-control mode of operation smoothing deviations in speed of rotation of the electric motor from the predetermined desired speed of rotation of the electric motor;

establishing a threshold value of motor speed which is less than the desired speed; and upon a drop in motor speed from the desired speed below the threshold value, terminating the speed control mode and initiating a full-load mode of operation wherein there is applied to the motor a constant value of a relatively large amount of current.

12. A system for controlling an electrohydraulic pressure supply for an auxiliary-force device of an automotive vehicle in which a hydraulic pump system is operated by means of an electric motor, the system comprising:

a reservoir of the pressure supply, a pressure-setting valve, and a pump for pumping hydraulic fluid into the reservoir via the pressure-setting valve, an output of the reservoir being connected to the auxiliary-force device;

an electric motor for driving the pump, a control device, a detector of speed of the motor, and a sensor of speed of the vehicle;

means for establishing a desired speed for the electric motor based on vehicle speed from the vehicle speed sensor; and wherein the control device is responsive to a speed signal of the detector for operation in either of two modes, the first mode being for activating the motor via a speed control for continuous rotation while smoothing any deviations of motor speed from the desired speed, and the second mode provides for deactivating the speed control and placing the motor in full-load operation.

13. A process for controlling an electrohydraulic pressure supply for an auxiliary-force device of an automotive vehicle in which a hydraulic pump system is operated by means of an electric motor, compressing steps of:

switching the electric motor between stand-by operation and full-load operation, the stand-by operation applying a relatively small amount of current to the motor and providing for control of speed of rotation of the electric motor to a desired value, the full-load operation applying a constant maximum value of current to the motor, the maximum value of current being greater than the relatively small amount of current; and wherein said switching step is implemented as a function of a speed of rotation of the electric motor.

14. A process according to claim 13, further comprising steps of:

providing the speed of rotation of the motor;

over a first period of time, observing a difference between the motor rotational speed and a first threshold speed value; and implementing said switching step upon an occurrence of said speed difference exceeding said first threshold value.

15. A process according to claim 14, wherein upon said occurrence of said speed difference exceeding said threshold value, said switching step provides for a switching from stand-by operation to full-load operation of the motor.

16. A process according to claim 13, further comprising steps of:

over a second period of time, greater than a minimum time, observing the motor rotational speed; and switching the motor from full-load operation to stand-by operation upon an occurrence of the motor rotational speed being greater than a second threshold speed value.

17. A process according to claim 16, wherein said observing step and said switching step provide, over a period of time, a dependable recognition as to the presence and absence of a full load at said motor.

18. A process according to claim 13, further comprising steps of:

observing deviations of motor rotational speed in stand-by operation from a predetermined desired speed of rotation; and leveling the motor rotational speed.

19. A process according to claim 18, further comprising a step of:

selecting the desired rotational speed for a power-assisted support for the electrohydraulic pressure supply.

20. A process according to claim 13, further comprising steps of:

operating the motor by pulse-width modulation;

detecting a speed of rotation of the motor; and implementing said switching step upon an occurrence of a pulse-duty ratio of said modulation exceeding a reference value of pulse duty ratio.

21. A process according to claim 20, wherein said switching step provides for a switching from stand-by operation to full-load operation upon the occurrence of the pulse-duty ratio exceeding the reference value.

22. A process for controlling an electrohydraulic pressure supply for an auxiliary device of an automotive vehicle, wherein the auxiliary device is powered by a hydraulic pump system operated by an electric motor, comprising steps of:

controlling the motor speed by a speed control during a stand-by mode of operation to maintain a stand-by speed of rotation of the motor;

detecting a drop in motor speed exceeding a threshold;

deactivating the speed control; and switching the motor from stand-by operation to full-load operation.

* * * * *